US006739572B2

(12) United States Patent
Shen et al.

(10) Patent No.: US 6,739,572 B2
(45) Date of Patent: May 25, 2004

(54) TIMING LOCK DEVICE FOR A FAUCET

(76) Inventors: Chung-Shan Shen, 58, Ma Yuan West St., Taichung (TW); Chi-Ching Shen, 58 Ma Yuan West St., Taichung (TW)

( * ) Notice: Subject to any disclaimer, the term of this patent is extended or adjusted under 35 U.S.C. 154(b) by 131 days.

(21) Appl. No.: 10/201,165

(22) Filed: Jul. 18, 2002

(65) Prior Publication Data

US 2004/0011978 A1 Jan. 22, 2004

(51) Int. Cl.[7] .............................................. F16K 31/12
(52) U.S. Cl. ........................................ 251/52; 251/339
(58) Field of Search ............................. 251/38, 50, 52, 251/339, 51

(56) References Cited

U.S. PATENT DOCUMENTS 4,940,206 A * 7/1990 Chung-Shan ................ 251/52
5,203,376 A * 4/1993 Chung-Shan ............... 137/801
5,651,531 A * 7/1997 Lu ............................. 251/229
6,131,608 A * 10/2000 Lu ............................. 137/550

* cited by examiner

Primary Examiner—Edward K. Look
Assistant Examiner—John K. Fristor, Jr.

(57) ABSTRACT

A timing lock device for a faucet includes a valve seat, a top cover, a locking washer, a relief rod, a locking valve shaft, and a compression spring. In use, the relief rod may be used to release the water pressure in the pressure storage chamber of the top cover. Then, the locking washer may be moved upward by the locking valve shaft, so that the water may flow outward. When not in use, the water may flow through the return through hole of the top cover into the pressure storage chamber. Thus, the water flow may be stopped automatically by the restoring force of the compression spring and the water pressure in the pressure storage chamber, thereby saving the manual work, and thereby achieving an excellent leakproof effect.

10 Claims, 9 Drawing Sheets

TIMING LOCK DEVICE FOR A FAUCET

BACKGROUND OF THE INVENTION

1. Field of the Invention

The present invention relates to a timing lock device for a faucet, and more particularly to a timing lock device for a faucet, wherein the water flow may be stopped automatically by the restoring force of the compression spring and the water pressure in the pressure storage chamber, thereby saving the manual work, and thereby achieving an excellent leakproof effect.

2. Description of the Related Art

The closest prior art references of which the applicant is aware are disclosed in U.S. Pat. Nos. 4,940,206 and 5,203,376. However, the above patents have the following disadvantages. The locking valve shaft protruded from the outlet of the faucet is easily oscillated, so that the locking washer cannot be closely fit in the pressure storage chamber, thereby shortening the lifetime. In addition, the locking washer mounted in the pressure storage chamber is subjected to a large water pressure, so that the locking valve shaft cannot be moved upward easily and conveniently.

SUMMARY OF THE INVENTION

The primary objective of the present invention is to provide a timing lock device for a faucet, wherein the water flow may be stopped automatically by the restoring force of the compression spring and the water pressure in the pressure storage chamber, thereby saving the manual work, and thereby achieving an excellent leakproof effect.

Another objective of the present invention is to provide a timing lock device for a faucet, wherein the relief rod may be used to release the water pressure in the pressure storage chamber of the top cover previously, so that the locking washer may be moved upward by the locking valve shaft conveniently.

A further objective of the present invention is to provide a timing lock device for a faucet, wherein the valve seat has an inner wall formed with an elongated hole which has multiple arcuate recesses, so that the water may flow through the elongated hole and the locking valve shaft may be moved in the elongated hole rigidly and stably.

In accordance with the present invention, there is provided a timing lock device for a faucet, comprising a valve seat, a top cover, a locking washer, a relief rod, and a locking valve shaft, wherein:

the valve seat has an inner wall having an upper portion formed with an inner thread and a lower portion formed with an elongated hole which has multiple arcuate recesses, the inner wall of the valve seat is formed with a valve hole located above the elongated hole, the valve seat has a periphery formed with multiple water connecting holes;

the top cover has an outer wall formed with an outer thread screwed into the inner thread of the valve seat, the top cover has an inside formed with a pressure storage chamber;

the locking washer is secured on a top of the locking valve shaft, and is movably mounted in the pressure storage chamber by the locking valve shaft, the locking washer has an inner wall formed with a relief hole and provided with multiple protruding ribs, the locking washer has a bottom edge rested on the valve hole of the valve seat;

the relief rod is slidably mounted in the locking valve shaft, and has a top provided with an enlarged relief valve, and a bottom provided with a reduced mounting post; and the locking valve shaft has an outer wall having a top formed with multiple through holes and multiple grooves located above the through holes for securing the multiple protruding ribs of the locking washer.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1–4, a timing lock device 3 in accordance with a preferred embodiment of the present invention is available for a faucet 1, and may be locked on an outlet of the faucet 1 by a connecting lock body 2. The outlet of the faucet 1 may have an inner thread or and outer thread for screwing the connecting lock body 2. If the outlet of the faucet 1 is not formed with a thread, the connecting lock body 2 may be secured on the outlet of the faucet 1 by a clamping ring. In use, a locking valve shaft 50 of the timing lock device 3 may be moved upward, so that the water may flow outward for use, and the water flow may be stopped automatically during a predetermined time.

The timing lock device 3 comprises a valve seat 30, a top cover 10, a locking washer 20, a relief rod 40, and a locking valve shaft 50.

Figure 3:
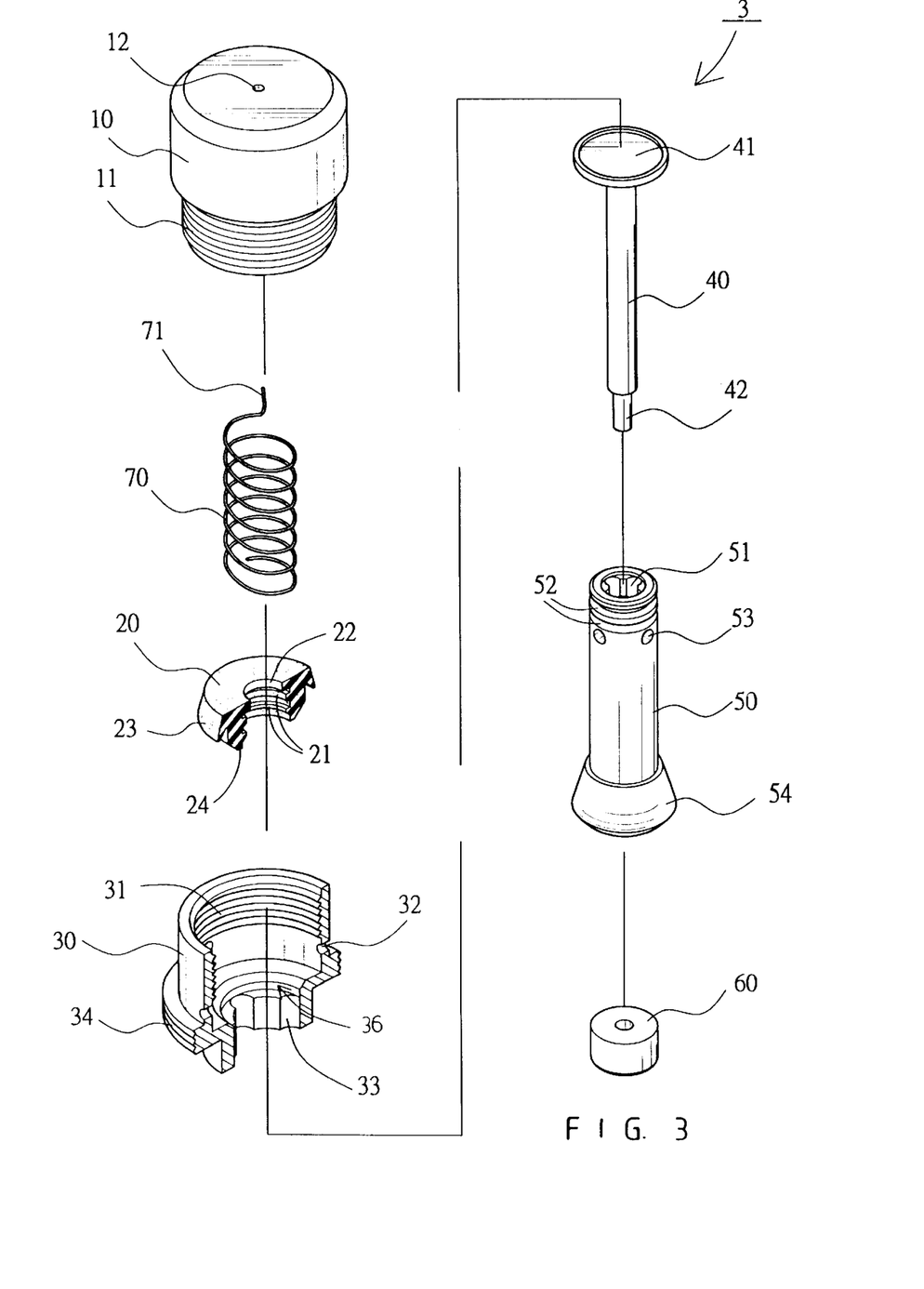
FIG. 3 is an exploded perspective view of the timing lock device for a faucet in accordance with the preferred embodiment of the present invention.
Figure 4:
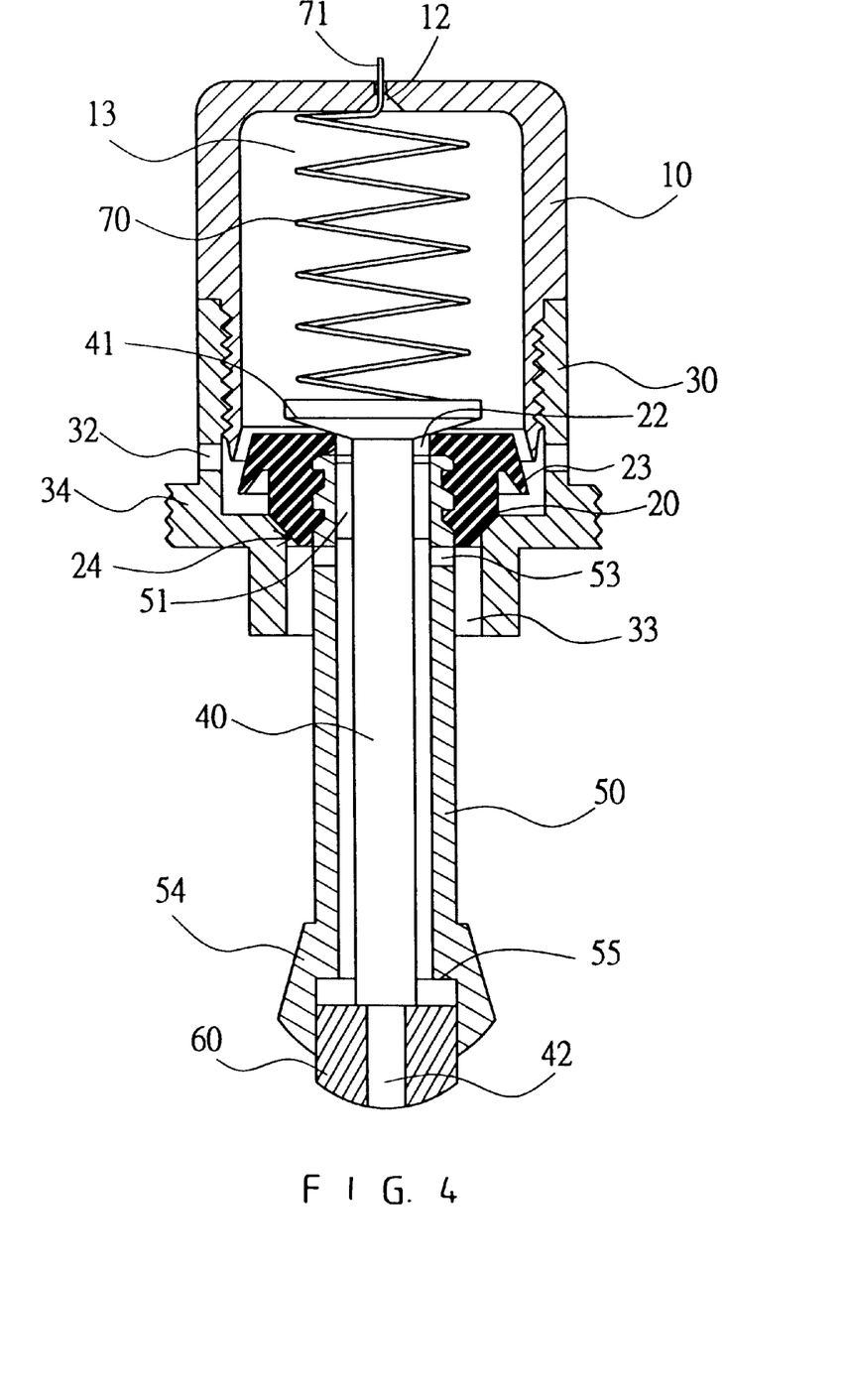
FIG. 4 is a side plan cross-sectional assembly view of the timing lock device for a faucet as shown in FIG. 3.

The valve seat 30 has a cylindrical shape, and has an outer wall formed with a threaded protruding ring 34. The valve seat 30 has an inner wall having an upper portion formed with an inner thread 31 and a lower portion formed with an elongated hole 33 which has multiple arcuate recesses. The inner wall of the valve seat 30 is formed with a valve hole 36 located above the elongated hole 33. The valve seat 30 has a periphery formed with multiple water connecting holes 32.

The top cover 10 has a cylindrical shape, and has an outer wall formed with an outer thread 11 screwed into the inner thread 31 of the valve seat 31. The top cover 10 has a top formed with a return through hole 12. The top cover 10 has an inside formed with a pressure storage chamber 13.

The locking washer 20 is made of rubber and has a ring shape. The locking washer 20 has an inner wall formed with a relief hole 22 and provided with multiple protruding ribs 21. The locking washer 20 has an outer wall provided with a wing plate 23 extending outward and downward. The locking washer 20 has a bottom edge 24 rested on the valve hole 36 of the valve seat 30.

The relief rod 40 has a top provided with an enlarged relief valve 41, and a bottom provided with a reduced mounting post 42.

The locking valve shaft 50 has a cylindrical shape. The locking valve shaft 50 has an inner wall having a top formed with an elongated hole 51 which has multiple arcuate recesses. The locking valve shaft 50 has an outer wall having a top formed with multiple through holes 53 and multiple grooves 52 located above the through holes 53 for securing the multiple protruding ribs 21 of the locking washer 20. The locking valve shaft 50 has a bottom provided with an enlarged holding portion 54. The holding portion 54 of the locking valve shaft 50 has an inner wall formed with a stop portion 55.

The timing lock device 3 further comprises a fixing sleeve 60 mounted on the mounting post 42 of the relief rod 40. The movement of the fixing sleeve 60 may be stopped by the stop portion 55 of the holding portion 54 of the locking valve shaft 50.

The timing lock device 3 further comprises a compression spring 70 mounted in the pressure storage chamber 13 of the top cover 10, and has a first end rested on an end wall of the top cover 10 and a second end rested on the relief valve 41 of the relief rod 40. The first end of the compression spring 70 is formed with a positioning portion 71 inserted into the return through hole 12 of the top cover 10.

In assembly, the top of the locking valve shaft 50 is extended through the elongated hole 33 of the valve seat 30. Then, the locking washer 20 is mounted on the top of the locking valve shaft 50, with each of the protruding ribs 21 of the locking washer 20 being inserted into each of the grooves 52 of the locking valve shaft 50. Then, the bottom of the relief rod 40 is extended through the relief hole 22 of the locking washer 20, the elongated hole 51 of the locking valve shaft 50 and the holding portion 54 of the locking valve shaft 50. Then, the fixing sleeve 60 is mounted on the mounting post 42 of the relief rod 40 to move therewith. The movement of the fixing sleeve 60 may be stopped by the stop portion 55 of the holding portion 54 of the locking valve shaft 50, thereby limiting movement of the relief rod 40 in the locking valve shaft 50. Then, the compression spring 70 is mounted in the pressure storage chamber 13 of the top cover 10, and the top cover 10 is screwed on the valve seat 30, wherein the positioning portion 71 of the compression spring 70 is inserted into the return through hole 12 of the top cover 10, and the second end of the compression spring 70 is rested on the relief valve 41 of the relief rod 40.

Thus, the timing lock device 3 in accordance with the preferred embodiment of the present invention is assembled.

Figure 1:
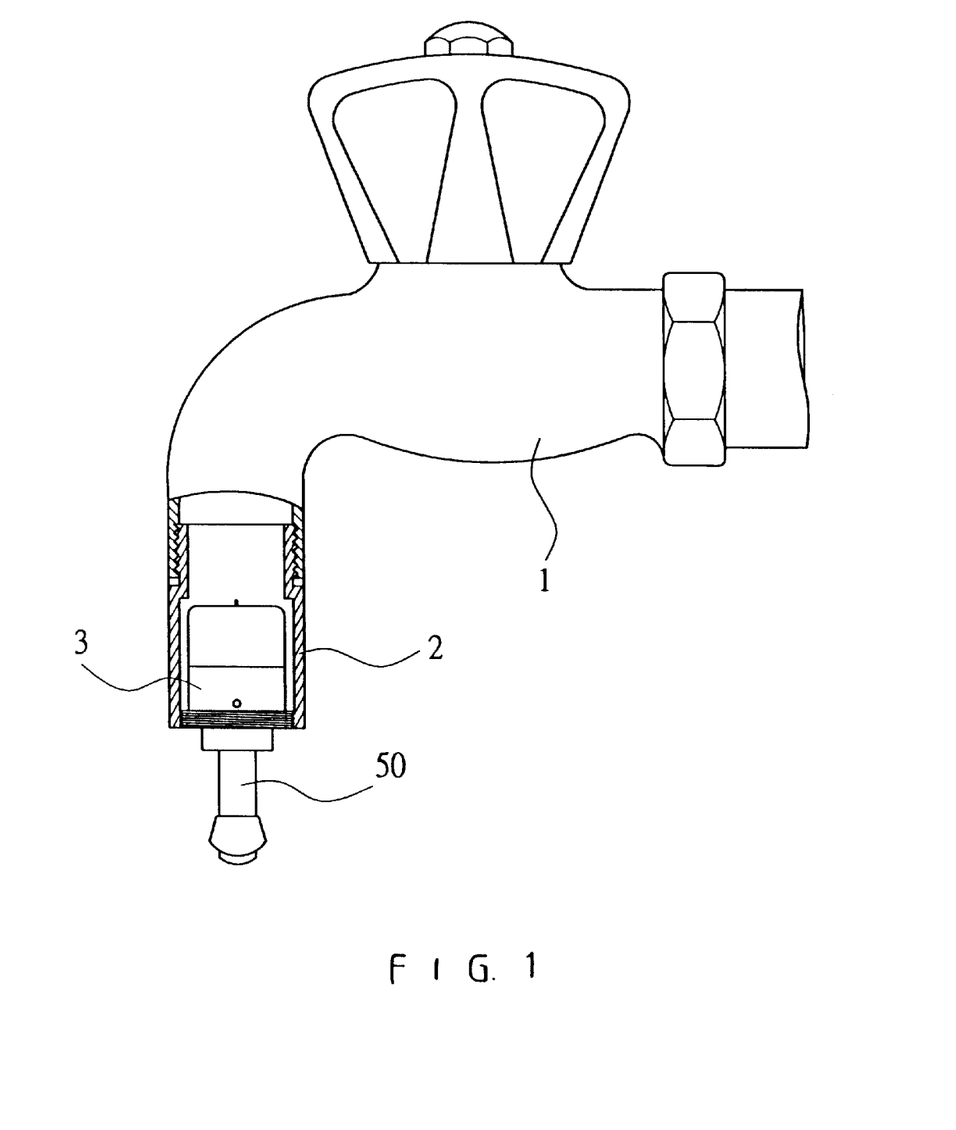
FIG. 1 is a schematic cross-sectional view of a timing lock device for a faucet in accordance with a preferred embodiment of the present invention.
Figure 2:
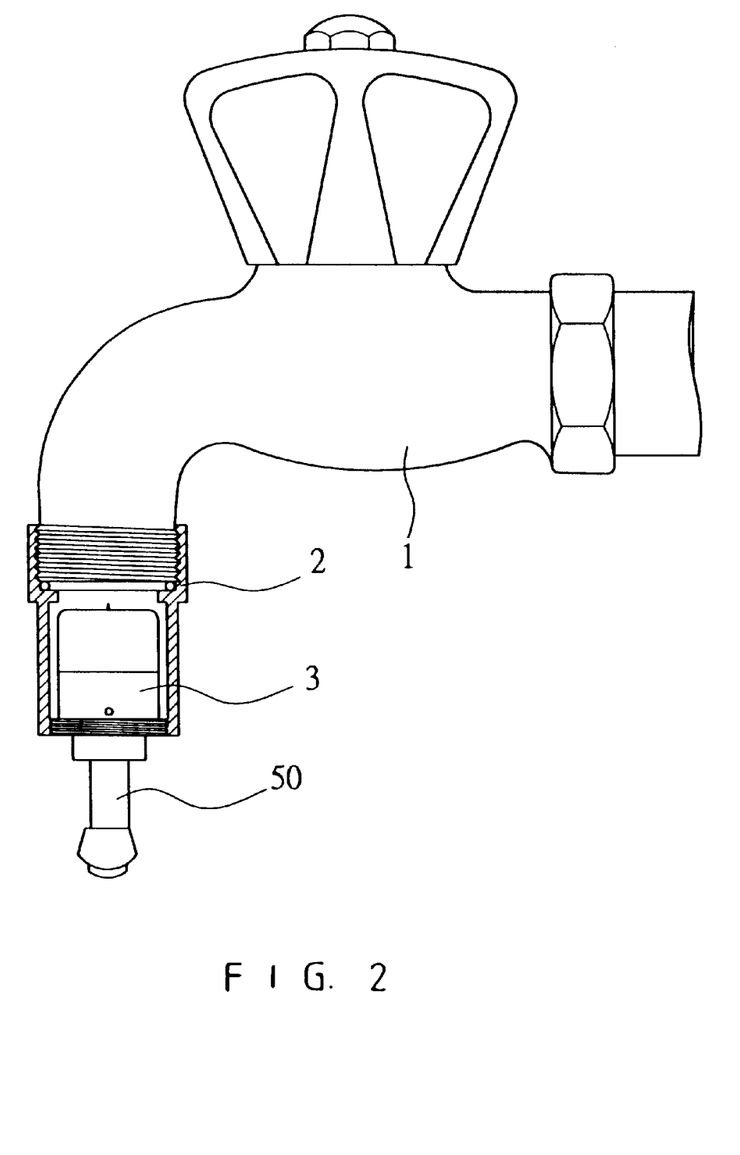
FIG. 2 is a schematic cross-sectional view of a timing lock device for a faucet in accordance with another embodiment of the present invention.

In practice, the protruding ring 34 of the valve seat 30 is screwed into the connecting lock body 2, so that the timing lock device 3 may be fixed on the outlet of the faucet 1.

In operation, referring to FIG. 4, at the static situation, the locking washer 20 is acted by the water pressure. The bottom edge 24 of the locking washer 20 is rested on the valve hole 36 of the valve seat 30 above the elongated hole 33, and the bottom edge of the relief valve 41 of the relief rod 40 may block the relief hole 22 of the locking washer 20, thereby forming a locking state, and thereby stopping the water flow.

Figure 5:
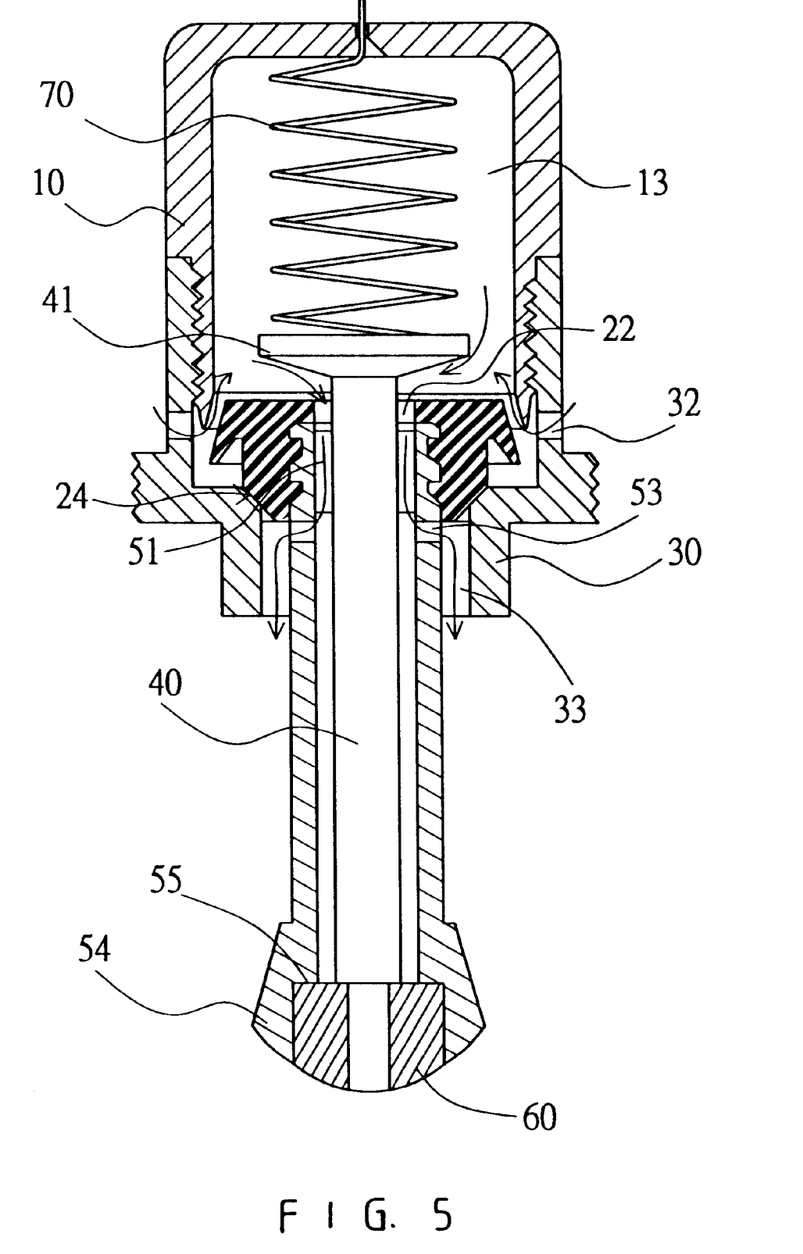
FIG. 5 is a schematic operational view of the timing lock device for a faucet as shown in FIG. 4.

Referring to FIG. 5, the fixing sleeve 60 is pressed upward to move the relief rod 40 upward, thereby detaching the bottom edge of the relief valve 41 of the relief rod 40 from the relief hole 22 of the locking washer 20, so that water contained in the pressure storage chamber 13 of the top cover 10 may flow through the elongated hole 51 and the through holes 53 of the locking valve shaft 50 into the elongated hole 33 of the valve seat 30, thereby releasing and reducing the water pressure in the pressure storage chamber 13 of the top cover 10. Thus, the water may flow outward from the elongated hole 33 of the valve seat 30 for use. The relief hole 22 of the locking washer 20 has a smaller diameter, so that the water flow rate is small, thereby achieving the purpose of saving water.

Figure 6:
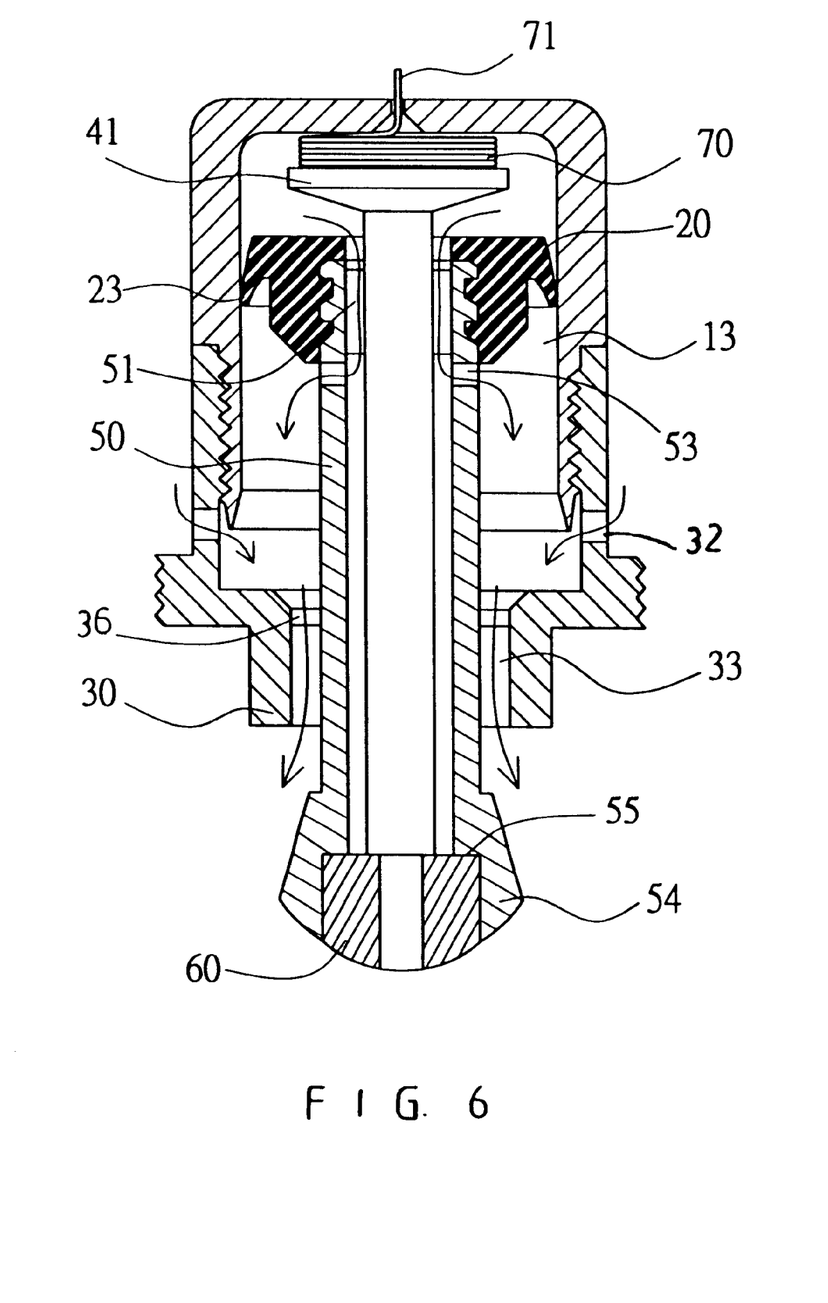
FIG. 6 is a schematic operational view of the timing lock device for a faucet as shown in FIG. 5.

Referring to FIG. 6, the fixing sleeve 60 is stopped by the stop portion 55 of the holding portion 54 of the locking valve shaft 50. Thus, when the fixing sleeve 60 is pressed upward, the locking valve shaft 50 and the locking washer 20 may be moved upward. At this time, the water pressure in the pressure storage chamber 13 of the top cover 10 has been released previously, so that the locking valve shaft 50 and the locking washer 20 may be moved upward easily and conveniently, thereby saving the manual work.

Thus, the water contained in the pressure storage chamber 13 between the top cover 10 and the locking washer 20 may flow through the elongated hole 51 and the through holes 53 of the locking valve shaft 50 into the elongated hole 33 of the valve seat 30. At the same time, the bottom edge 24 of the locking washer 20 is detached from the valve hole 36 of the valve seat 30 above the elongated hole 33, so that the water flowing through the multiple water connecting holes 32 of the valve seat 30 into the pressure storage chamber 13 may also flow into the elongated hole 33 of the valve seat 30, thereby providing a larger water flow rate for use.

Figure 7:
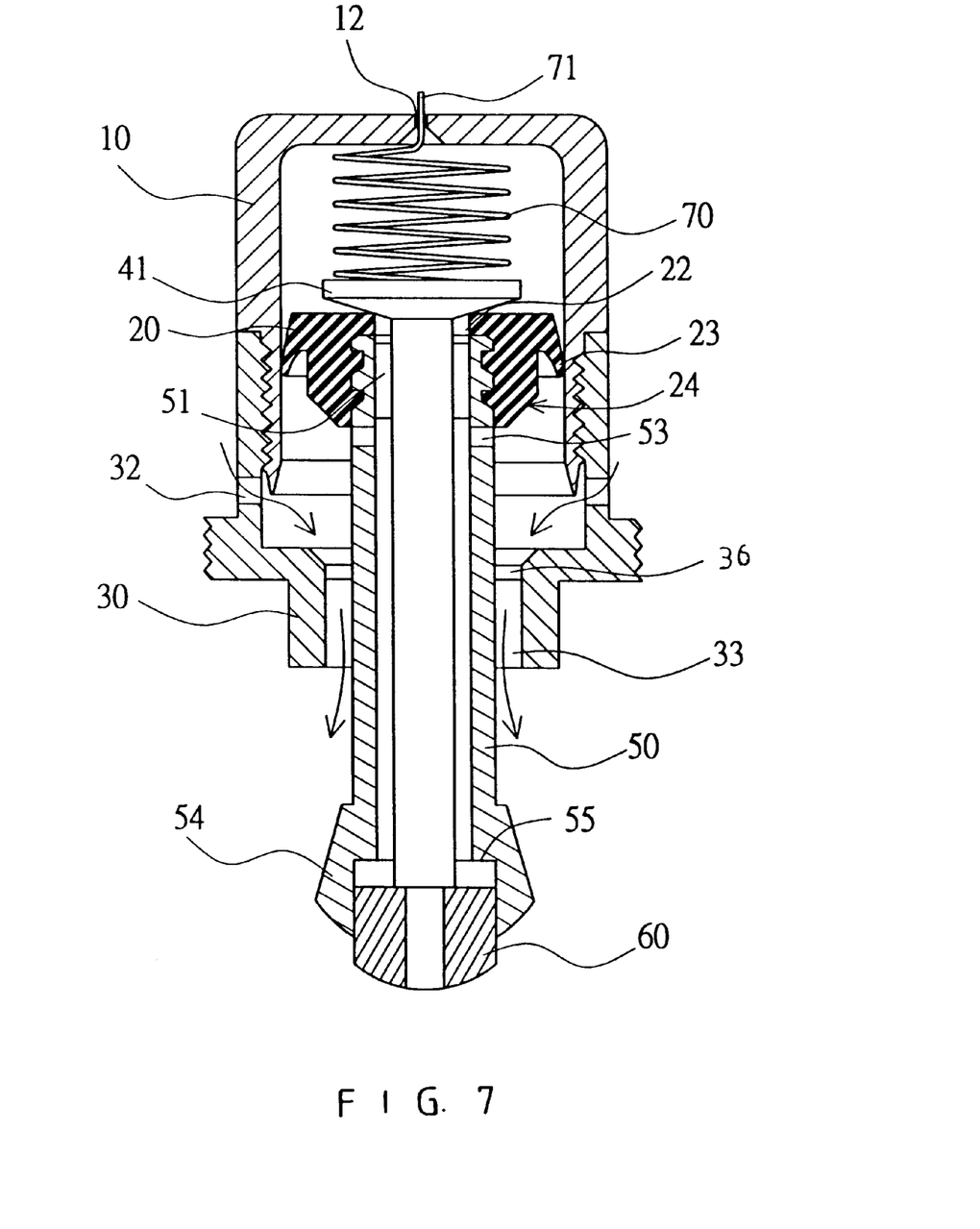
FIG. 7 is a schematic operational view of the timing lock device for a faucet as shown in FIG. 6.

Referring to FIG. 7, the relief valve 41 of the relief rod 40 may be pressed to move downward by the restoring force of the compression spring 70, so that the bottom edge of the relief valve 41 of the relief rod 40 may block the relief hole 22 of the locking washer 20. At this time, water may flow through the return through hole 12 of the top cover 10 into the pressure storage chamber 13 between the top cover 10 and the locking washer 20, so that the locking valve shaft 50 may be moved downward by the restoring force of the compression spring 70 and the water pressure in the pressure storage chamber 13. Thus, the locking valve shaft 50 may be moved from the position as shown in FIG. 7 to the position as shown in FIG. 4 where the bottom edge 24 of the locking washer 20 is rested on the valve hole 36 of the valve seat 30 above the elongated hole 33, thereby forming a locking state, and thereby stopping the water flow.

Accordingly, the timing lock device 3 in accordance with the preferred embodiment of the present invention may lock and stop the water flow automatically by the restoring force of the compression spring 70 and the water pressure in the pressure storage chamber 13, thereby saving the manual work, and thereby achieving an excellent leakproof effect. In addition, the positioning portion 71 of the compression spring 70 may sway in the return through hole 12 of the top cover 10, so as to clear the return through hole 12 of the top cover 10, thereby preventing the return through hole 12 of the top cover 10 from being blocked due to impurities. Further, the relief rod 40 may be moved in the locking valve shaft 50 rigidly and stably by limit of the elongated hole 51 of the locking valve shaft 50 and the fixing sleeve 60. Further, the locking valve shaft 50 may be moved rigidly and stably by limit of the elongated hole 33 of the valve seat 30 and the wing plate 23 of the locking washer 20.

Figure 8:
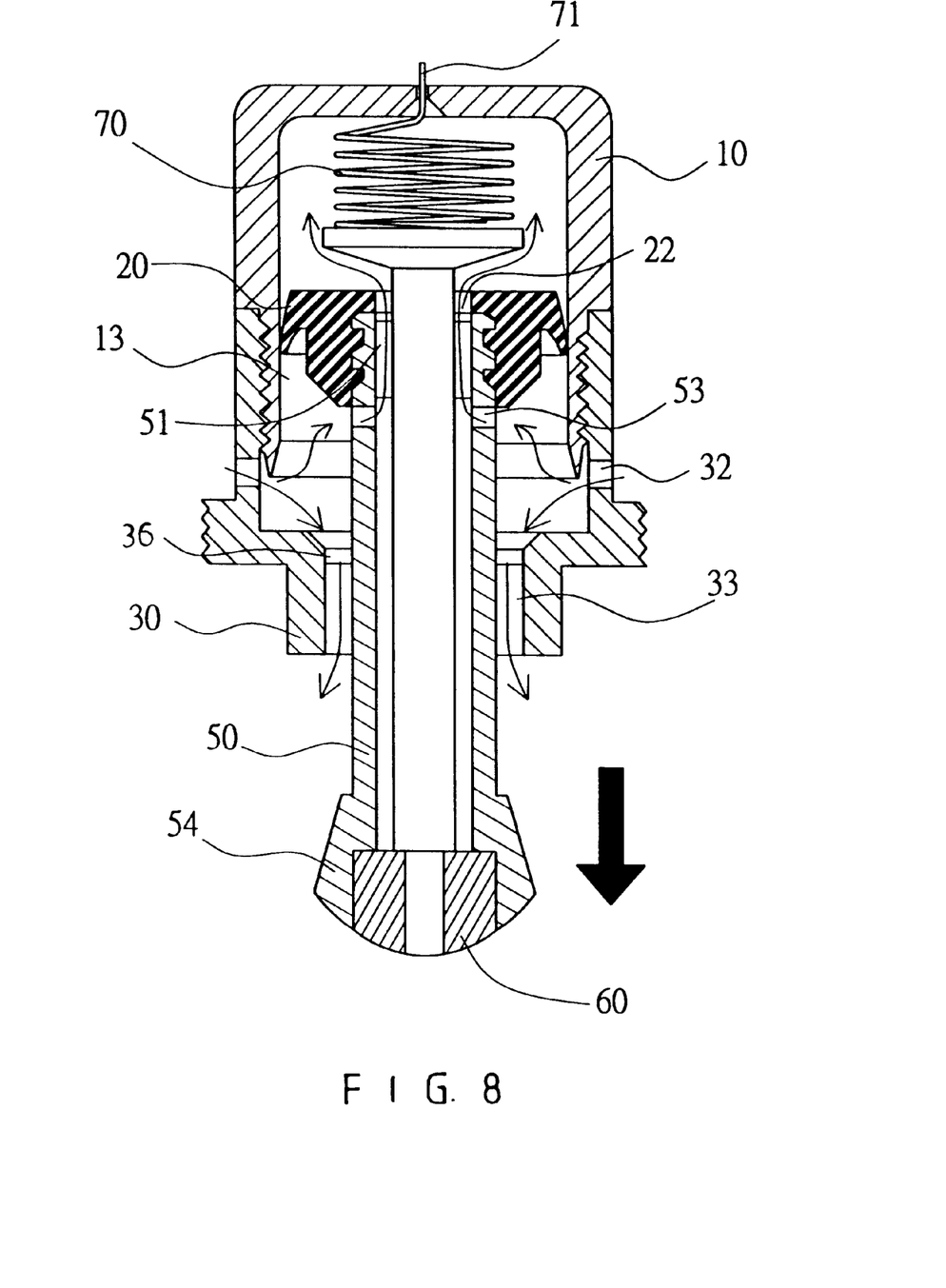
FIG. 8 is a schematic operational view of the timing lock device for a faucet as shown in FIG. 6.

Referring to FIG. 8, the user may directly hold the holding portion 54 of the locking valve shaft 50 to move the locking valve shaft 50 downward. Thus, the fixing sleeve 60 may be moved upward to move the relief rod 40 upward, thereby detaching the bottom edge of the relief valve 41 of the relief rod 40 from the relief hole 22 of the locking washer 20, so that the water may flow through the elongated hole 51 and the through holes 53 of the locking valve shaft 50 into the pressure storage chamber 13 between the top cover 10 and the locking washer 20, so that the locking valve shaft 50 and the locking washer 20 may be moved downward easily and rapidly.

Figure 9:
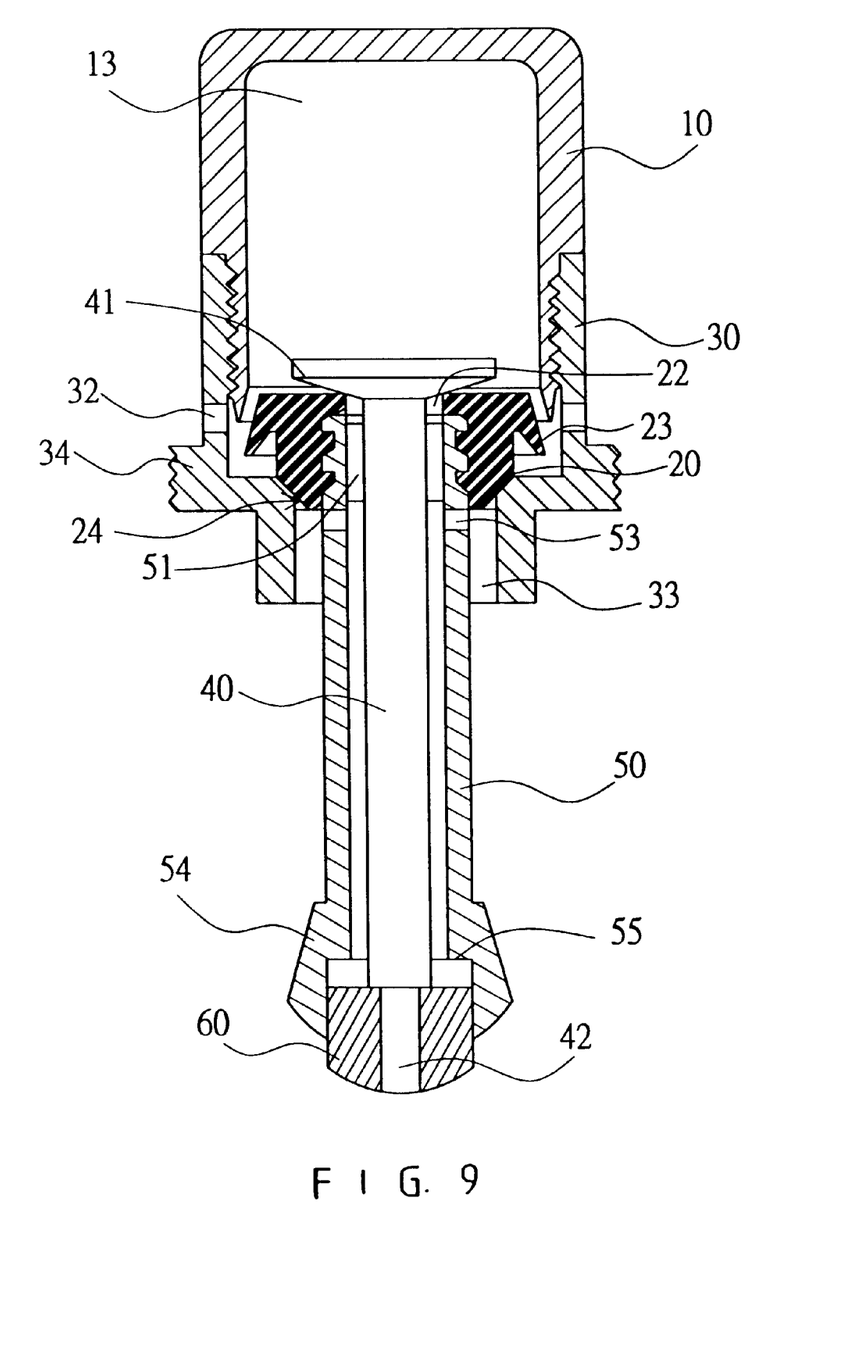
FIG. 9 is a side plan cross-sectional assembly view of a timing lock device for a faucet in accordance with another embodiment of the present invention.

Referring to FIG. 9, a timing lock device in accordance with another embodiment of the present invention is shown, wherein the return through hole 12 of the top cover 10 and the compression spring 70 are undefined, thereby saving the parts and saving the cost of fabrication.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A timing lock device for a faucet, comprising a valve seat, a top cover, a locking washer, a relief rod, and a locking valve shaft, wherein:

the valve seat has an inner wall having an upper portion formed with an inner thread and a lower portion formed with an elongated hole which has multiple arcuate recesses, the inner wall of the valve seat is formed with a valve hole located above the elongated hole, the valve seat has a periphery formed with multiple water connecting holes;

the top cover has an outer wall formed with an outer thread screwed into the inner thread of the valve seat, the top cover has an inside formed with a pressure storage chamber;

the locking washer is secured on a top of the locking valve shaft, and is movably mounted in the pressure storage chamber by the locking valve shaft, the locking washer has an inner wall formed with a relief hole and provided with multiple protruding ribs, the locking washer has a bottom edge rested on the valve hole of the valve seat;

the relief rod is slidably mounted in the locking valve shaft, and has a top provided with an enlarged relief valve, and a bottom provided with a reduced mounting post; and the locking valve shaft has an outer wall having a top formed with multiple through holes and multiple grooves located above the through holes for securing the multiple protruding ribs of the locking washer.

2. The timing lock device for a faucet in accordance with claim 1, wherein the top cover has a top formed with a return through hole.

3. The timing lock device for a faucet in accordance with claim 1, wherein the valve seat has an outer wall formed with a threaded protruding ring.

4. The timing lock device for a faucet in accordance with claim 1, wherein the locking washer has an outer wall provided with a wing plate extending outward and downward.

5. The timing lock device for a faucet in accordance with claim 1, wherein the locking valve shaft has an inner wall having a top formed with an elongated hole which has multiple arcuate recesses.

6. The timing lock device for a faucet in accordance with claim 1, wherein the locking valve shaft has a bottom provided with an enlarged holding portion.

7. The timing lock device for a faucet in accordance with claim 1, further comprising a fixing sleeve mounted on the mounting post of the relief rod.

8. The timing lock device for a faucet in accordance with claim 7, wherein the locking valve shaft has a bottom provided with an enlarged holding portion which has an inner wall formed with a stop portion for stopping movement of the fixing sleeve.

9. The timing lock device for a faucet in accordance with claim 1, wherein further comprising a compression spring mounted in the pressure storage chamber of the top cover, and has a first end rested on an end wall of the top cover and a second end rested on the relief valve of the relief rod.

10. The timing lock device for a faucet in accordance with claim 9, wherein the top cover has a top formed with a return through hole, and the first end of the compression spring is formed with a positioning portion inserted into the return through hole of the top cover.

* * * * *